US012658357B2

(12) United States Patent
Kim et al.

(10) Patent No.: US 12,658,357 B2
(45) Date of Patent: Jun. 16, 2026

(54) COIL AND ELECTRICAL SYSTEM INCLUDING THE SAME

(71) Applicant: 3M INNOVATIVE PROPERTIES COMPANY, St. Paul, MN (US)

(72) Inventors: Jinwook Kim, Hwaseong-si (KR); Seong-Woo Woo, Gwangju-si (KR)

(73) Assignee: 3M Innovative Properties Co., St. Paul, MN (US)

( * ) Notice: Subject to any disclaimer, the term of this patent is extended or adjusted under 35 U.S.C. 154(b) by 657 days.

(21) Appl. No.: 18/249,420

(22) PCT Filed: Oct. 18, 2021

(86) PCT No.: PCT/IB2021/059584
§ 371 (c)(1),
(2) Date: Apr. 18, 2023

(87) PCT Pub. No.: WO2022/090861
PCT Pub. Date: May 5, 2022

(65) Prior Publication Data
US 2023/0395306 A1 Dec. 7, 2023

(30) Foreign Application Priority Data
Oct. 27, 2020 (KR) ........................ 10-2020-0140193

(51) Int. Cl.
*H01F 27/29* (2006.01)
*H02J 50/00* (2016.01)
*H02J 50/10* (2016.01)

(52) U.S. Cl.
CPC ............ *H01F 27/29* (2013.01); *H02J 50/005* (2020.01); *H02J 50/10* (2016.02)

(58) Field of Classification Search
CPC ........ H01F 27/29; H01F 27/2852; H01F 5/04; H01F 27/2871; H01F 38/14; H02J 50/005; H02J 50/10; H02J 50/402
(Continued)

(56) References Cited

U.S. PATENT DOCUMENTS

| | | | |
|---|---|---|---|
| 7,710,232 B1 * | 5/2010 | Stalford | .................. H01F 21/04 |
| | | | 336/200 |
| 9,712,209 B2 | 7/2017 | Kim et al. | |

(Continued)

FOREIGN PATENT DOCUMENTS

| | | |
|---|---|---|
| CN | 109036796 A | 12/2018 |
| JP | 09045531 A | 2/1997 |

(Continued)

OTHER PUBLICATIONS

International Search Report for PCT International Application No. PCT/IB2021/059584, mailed on Jan. 20, 2022, 4 pages.

*Primary Examiner* — Tuyen T Nguyen
(74) *Attorney, Agent, or Firm* — Gregg H. Rosenblatt

(57) ABSTRACT

The present disclosure relates to a coil and an electrical system. According to an embodiment of the present disclosure, specifically, there is provided a coil including: main coil surfaces which face each other and are substantially planar; and a multilayer film which is wound to form a plurality of loops which are substantially concentric, wherein the plurality of loops include an innermost loop including a first longitudinal end of the multilayer film, a first intermediate loop, and an outermost loop including a second longitudinal end of the multilayer film, wherein the multilayer film includes a first electrical conduction layer, a second magnetic conduction layer, and a third adhesive layer, wherein the second magnetic conduction layer is coupled with the first electrical conduction layer by the third adhesive layer, wherein the first electrical conduction layer, (Continued)

the second magnetic conduction layer, and the third adhesive layer have widths and lengths which are substantially coextensive with one another, such that the main coil surfaces which are substantially planar include corresponding end surfaces of the first electrical conduction layer, the second magnetic conduction layer, and the third adhesive layer, respectively, wherein the first intermediate loop is disposed between the innermost loop and the outermost loop, wherein a first electro-conductive terminal is terminated on the first electrical conduction layer of the first intermediate loop.

7 Claims, 11 Drawing Sheets

(58) Field of Classification Search
USPC ..................................... 336/65, 83, 200, 232
See application file for complete search history.

(56) References Cited

U.S. PATENT DOCUMENTS

| | | |
|---|---|---|
| 2013/0249302 A1 | 9/2013 | An et al. |
| 2020/0076232 A1 | 3/2020 | Woo et al. |
| 2024/0296985 A1* | 9/2024 | Kim ......................... H01F 10/14 |
| 2025/0046508 A1* | 2/2025 | Kim ......................... H01F 38/14 |

FOREIGN PATENT DOCUMENTS

| | | |
|---|---|---|
| KR | 20170073209 A | 6/2017 |
| WO | 2019099011 A1 | 5/2019 |
| WO | 2020044203 A1 | 3/2020 |
| WO | 2021156732 A1 | 8/2021 |

* cited by examiner

211(210)

114          111          113    112

110

A – A'

COIL AND ELECTRICAL SYSTEM INCLUDING THE SAME

CROSS REFERENCE TO RELATED APPLICATIONS

This application is a national stage filing under 35 U.S.C. 371 of PCT/IB2021/059584 filed Oct. 18, 2021, which claims the benefit of Korean Application No. 10-2020-0140193, filed Oct. 27, 2020, the disclosures of which are incorporated by reference in their entireties herein.

BACKGROUND

Technical Field

The present disclosure relates to a coil and an electrical system including the same.

Background Art

A recent portable electronic device having a battery embedded therein, such as a smartphone, a personal digital assistant (PDA), a tablet, etc., is required to be charged with power. In order to charge a battery embedded in a portable electronic device, etc., systems for wirelessly transmitting power are increasingly used in recent years. Such a wireless charging system (wireless power charging (WPC)) transmits and receives power by using electromagnetic induction or resonance, and to achieve this, a coil is provided in an electronic device.

In addition, the portable electronic device may provide various functions such as a short-range wireless communication system (near field communication (NFC)) and a wireless electronic payment system (magnetic secure transmission (MST), etc., as well as the wireless charging system. In particular, the portable electronic device has a plurality of coils provided therein to perform the short-range wireless communication and the wireless electronic payment system.

As described above, the portable electronic device has the plurality of coils installed therein to perform the wireless charging system, the short-range wireless communication system and the wireless electronic payment system, independently.

SUMMARY

Technical Problem

A related-art portable electronic device has a pattern formed on a copper sheet used for an FPCB substrate through etching. Since a thickness of the copper sheet is associated with efficiency of a coil, the portable electronic device should be manufactured to have a thick copper sheet in order to increase wireless charging efficiency of the electronic device. However, when the copper sheet is manufactured to be thick, a manufacturing cost may increase, and, when the thick copper sheet is etched, the degree of precision of etching may be degraded.

On the other hand, a plurality of coils provided in a related-art portable electronic device of other methods may be manufactured separately to perform different functions, independently, and may be disposed on different positions of the electronic device. For example, a method of manufacturing a coil by winding a wire may not wind a plurality of coils simultaneously. Accordingly, a plurality of independent coils may be manufactured and a plurality of functions may be provided by combining the coils. As described above, since the plurality of coils are disposed on different positions, the coils occupy more spaces and a production cost in manufacturing the plurality of coils increases, and much process time is required.

However, in order to improve competitiveness in the market of portable electronic devices such as smartphones, it is important to develop electronic devices that can reduce a production cost while providing various functions. Accordingly, embodiments of the present disclosure has been invented considering the above-described background, and provide an electrical system which can more intensively utilize a space.

In addition, the present disclosure provides an electrical system which can reduce a cost and a process time required to produce a plurality of coils.

Technical Solution

According to one aspect of the present disclosure, there is provided a coil including: main coil surfaces which face each other and are substantially planar; and a multilayer film which is wound to form a plurality of loops which are substantially concentric, wherein the plurality of loops include an innermost loop including a first longitudinal end of the multilayer film, a first intermediate loop, and an outermost loop including a second longitudinal end of the multilayer film, wherein the multilayer film includes a first electrical conduction layer, a second magnetic conduction layer, and a third adhesive layer, wherein the second magnetic conduction layer is coupled with the first electrical conduction layer by the third adhesive layer, wherein the first electrical conduction layer, the second magnetic conduction layer, and the third adhesive layer have widths and lengths which are substantially coextensive with one another, such that the main coil surfaces which are substantially planar include corresponding end surfaces of the first electrical conduction layer, the second magnetic conduction layer, and the third adhesive layer, respectively, wherein the first intermediate loop is disposed between the innermost loop and the outermost loop, wherein a first electro-conductive terminal is terminated on the first electrical conduction layer of the first intermediate loop.

In addition, there is provided an electrical system including: a plurality of concentric loops including an innermost loop and an outermost loop, each loop including a first electrical conduction layer and a second magnetic conduction layer, the first electrical conduction layer and the second magnetic conduction layer having widths and lengths which are substantially coextensive; and a plurality of electric circuits, wherein each of the electric circuits includes a pair of terminal leads and a pair of terminals which are attached to the electric circuit and are extended from the electric circuit, wherein each pair of the terminals of the electric circuit is terminated on the first electrical conduction layer of different concentric loops from among the plurality of concentric loops of the coil, wherein at least two terminal leads of the plurality of terminal leads of the plurality of electric circuits are terminated on the first electrical conduction layer of the same loop of the plurality of concentric loops which are positioned at a first location and a second location, respectively, wherein the first electrical conduction layer is formed to be discontinuous at a third location between the first location and the second location.

Advantageous Effects

According to various embodiments of the present disclosure, there is an effect that a space can be more intensively utilized.

In addition, there is an effect that a production cost and a processing time of a plurality of coils can be reduced.

DETAILED DESCRIPTION

Figure 1:
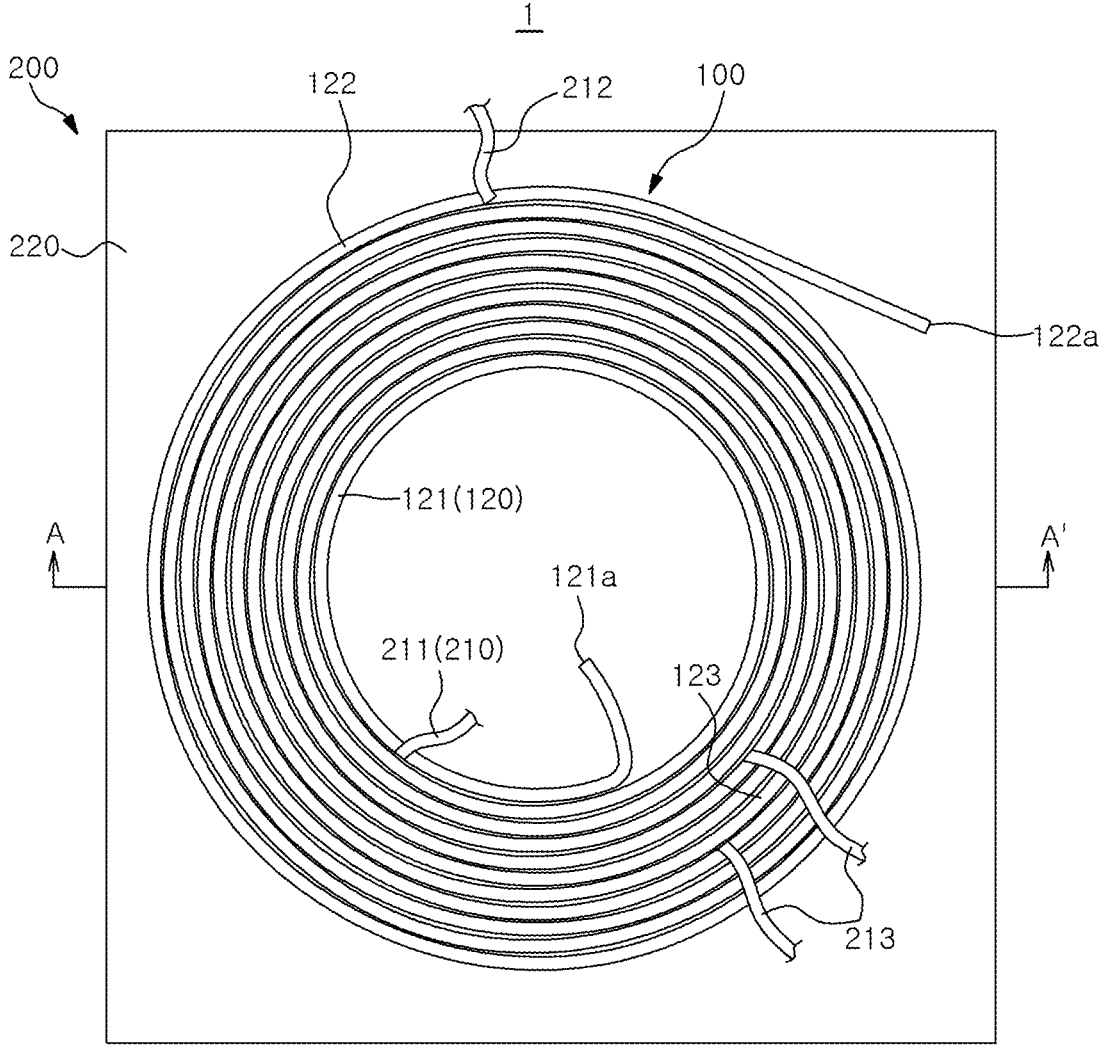
FIG. 1 is a top view of an electrical system according to a first embodiment of the present disclosure.

Hereinafter, specific embodiments for implementing the technical concept of the present disclosure will be described in detail with reference to the drawings.

Further, in explaining the present disclosure, any specific explanation on a well-known related configuration or function deemed to obscure the gist of the present disclosure will be omitted.

In addition, it should be understood that, when a certain element is referred to as being "connected to," "coupled to," or "in contact with" another element, the certain element can be directly connected to, coupled to, or in contact with another element, but there may be an intervening element therebetween.

The terms used herein are only for describing certain exemplary embodiments, and not intended to limit the scope of the disclosure. Unless otherwise specified, a singular expression includes a plural expression.

In addition, in the specification, the expressions "upper side surface," "lower side surface," etc. are described with reference to illustrations in the drawings, and it is to be noted that these may be expressed differently when the orientation of a corresponding object is changed. For the same reason, some element may be exaggerated, omitted or schematically illustrated in the drawings, and the size of each element does not entirely reflect a real size.

In addition, the terms including ordinal numbers such as 'first' and 'second' may be used to describe various elements, but these elements should not be limited by such terms. These terms are used for the purpose of distinguishing one element from another element only.

The term "includes" used in this specification specifies a specific feature, area, integer, step, operation, element, and/or component, and does not preclude the presence or addition of other specific features, areas, integers, steps, operations, elements, components, and/or groups.

Figure 2:
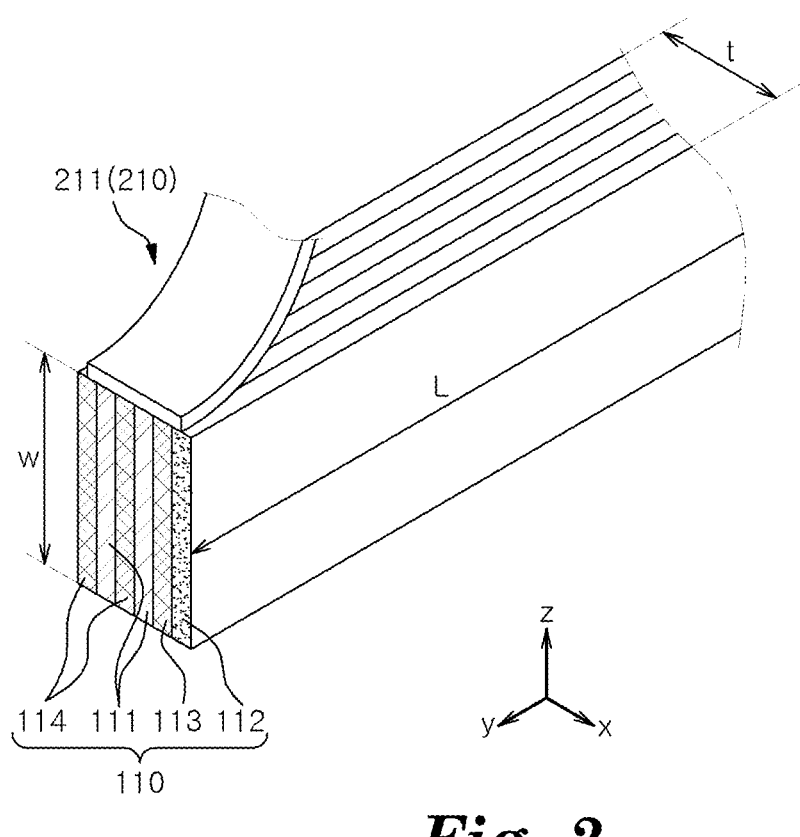
FIG. 2 is a partial cross-sectional perspective view of a coil and a terminal unit of FIG. 1.

In the specification, a thickness direction refers to an x-axis direction of FIG. 2, and a longitudinal direction refers to a y-axis direction of FIG. 2. In addition, a width direction refers to a z-axis direction of FIG. 2.

Hereinafter, a detailed configuration of an electrical system 1 according to a first embodiment of the present disclosure will be described with reference to the drawings.

Hereinafter, referring to FIG. 1, the electrical system 1 according to the first embodiment of the present disclosure may be installed in a portable electronic device such as a smartphone, a PDA, a tablet, etc., and may provide various functions. For example, the electrical system 1 may provide a wireless charging function (wireless power charging (WPC)) for wirelessly charging a battery, and may transmit and receive power through electromagnetic induction. In addition, the electrical system 1 may provide one or more functions of a short-range wireless communication system (near field communication (NFC)) and a wireless electronic payment system (magnetic secure transmission (MST)). The electrical system 1 may include a coil 100 and a flexible circuit board 200.

The coil 100 may provide a portion through which a current flows. The coil 100 may be electrically connected with the flexible circuit board 200, and may be disposed on the flexible circuit board 200. In addition, the coil 100 may include a multilayer film 110.

Figure 3:
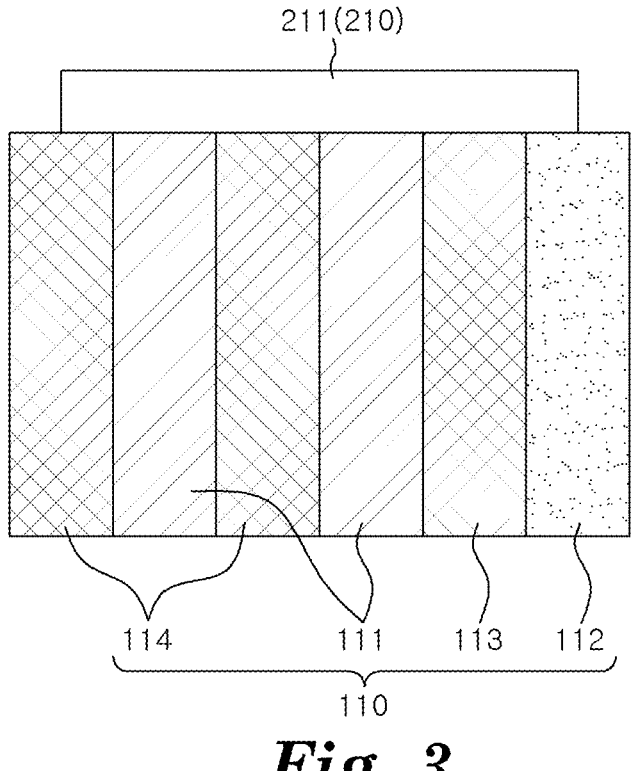
FIG. 3 is a front view of FIG. 2.

Referring to FIGS. 2 and 3, the multilayer film 110 may have a multilayer structure, and may include a conductive material through which current flows. In addition, the multilayer film 110 may include a first electrical conduction layer 111, a second magnetic conduction layer 112, a third adhesive layer 113, and a fourth adhesive layer 114.

The first electrical conduction layer 111 may include a metallic material enabling a current to flow therethrough. In addition, a plurality of first electrical conduction layers 111 may be provided. One surface of the first electrical conduction layer 111 may be coupled with the third adhesive layer 113, and the other surface of the first electrical conduction layer 111 may be coupled with the fourth adhesive layer 114. For example, the first electrical conduction layer 111 may be coupled with the second magnetic conduction layer 112 through the third adhesive layer 113. In addition, the first electrical conduction layer 111 may be coupled with another first electrical conduction layer 111 through the fourth adhesive layer 114. On the other hand, the first electrical conduction layer 111 may be electrically, physically connected with a terminal unit 210.

The second magnetic conduction layer 112 may include a material having magnetism. The second magnetic conduction layer 112 may adhere to one surface of the third adhesive layer 113 to adhere to the first electrical conduction layer 111. In other words, the second magnetic conduction layer 112 may be coupled with the first electrical conduction layer 111 through the third adhesive layer 113 which is provided between the second magnetic conduction layer 112 and the first electrical conduction layer 111. In addition, when the multilayer film 110 forms a loop 120, which will be described below, the second magnetic conduction layer 112 may be coupled with the fourth adhesive layer 114 of an adjacent loop 120. In this case, the second magnetic conduction layer 112 may be coupled with another loop 120 through the fourth adhesive layer 114. In addition, the second magnetic conduction layer 112 may be disposed on an outermost side of the multilayer film 110 in the thickness direction. In other words, when the multilayer film 110 forms the loop 120, the second magnetic conduction layer 112 may be disposed in an outward direction of the loop 120 within the multilayer film 110.

The third adhesive layer 113 may include an adhesive material which adheres to one layer adjacent to one side thereof and to another layer adjacent to the other side thereof to bond between different layers, and may couple the first electrical conduction layer 111 and the second magnetic conduction layer 112. The third adhesive layer 113 may be disposed between the first electrical conduction layer 111 and the second magnetic conduction layer 112.

The fourth adhesive layer 114 may include an adhesive material which adheres to one layer adjacent to one side thereof and to another layer adjacent to the other side thereof to bond between different layers, and may couple two adjacent first electrical conduction layers 111 from among the plurality of first electrical conduction layers 111. In addition, the fourth adhesive layer 114 may couple adjacent loops 120 from among the plurality of loops 120 which are substantially concentric. In other words, the fourth adhesive layer 114 of one of the plurality of loops 120 may be coupled with the second magnetic conduction layer 112 of another of the plurality of loops 120, such that adjacent loops 120 are coupled with each other.

As described above, the adhesive layers 113, 114 may be disposed between one of the plurality of first electrical conduction layers 111, and the second magnetic conduction layer 112. In addition, the adhesive layer 113, 114 may be disposed between adjacent layers from among the plurality of first electrical conduction layers 111.

In the specification, the first electrical conduction layer 111, the second magnetic conduction layer 112, and the third adhesive layer 113 may be referred to as first to third layers 111, 112, 113, respectively. In addition, the first electrical conduction layer 111, the second magnetic conduction layer 112, the third adhesive layer 113, and the fourth adhesive layer 114 may be referred to as first to fourth layers 111, 112, 113, 114, respectively.

Referring back to FIG. 1, the coil 100 may be wound to form the plurality of loops 120 which are substantially concentric. In other words, the multilayer film 110 may be provided to form the plurality of loops 120 by winding a linear long film multiple times. In the specification, the loop 120 refers to a state in which the multilayer film 110 is wound multiple times to surround a predetermined center. In addition, the plurality of loops 120 does not mean loops having different centers, but means the plurality of loops having the same center. In addition, the plurality of loops may be connected with one another to have a concept of one loop. The plurality of loops 120 may include an innermost loop 121, an outermost loop 122, and a first intermediate loop 123.

The innermost loop 121 is a loop 120 that is disposed on the innermost side from among the plurality of loops 120, and may include a first longitudinal end 121a which is an end at one side of the coil 100.

The outermost loop 122 is a loop 120 that is disposed on the outermost side from among the plurality of loops 120 and may include a second longitudinal end 122a which is an end at the other side of the coil 100.

Herein, the first longitudinal end 121a refers to an end at one side of the multilayer film 110 in the longitudinal direction, and the second longitudinal end 122a refers to an end at the opposite side of the multilayer film 110 in the longitudinal direction. In addition, the longitudinal direction may be a direction in which the multilayer film 110 is extended.

The first intermediate loop 123 may be disposed between the outermost loop 122 and the innermost loop 121. One end of the first intermediate loop 120 is connected with the outermost loop 122, and the other end is connected with the innermost loop 121.

The innermost loop 121, the outermost loop 122, and the first intermediate loop 123 may provide different functions. In addition, the functions provided by the innermost loop 121, the outermost loop 122, and the first intermediate loop 123 may be independent from one another or dependent on one another. For example, when a current flows through the coil 100, the innermost loop 121 may provide a function of a wireless charging coil, the outermost loop 122 may provide a short-range wireless communication system role, and the first intermediate loop 123 may provide a role of a wireless electronic payment system.

As described above, the innermost loop 121, the outermost loop 122, and the first intermediate loop 123 may provide different functions to one coil 100. However, the innermost loop 121, the outermost loop 122, and the first intermediate loop 123 may be connected with one another to influence one another, but this influence is insignificant for the loop 120 to implement respective functions. Accordingly, there is an effect that the innermost loop 121, the outermost loop 122, and the first intermediate loop 123 provide independent functions.

Figure 4:
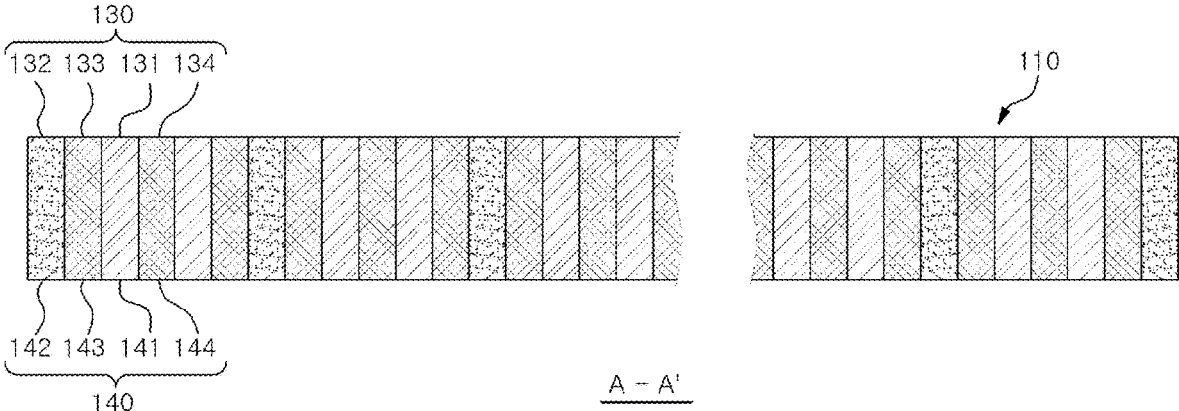
FIG. 4 is a cross-sectional view taken on line A-A' of FIG. 1.

Referring to FIG. 4, the coil 100 may include main coil surfaces 130, 140. The main coil surfaces 130, 140 may be extended between the first longitudinal end 121a and the second longitudinal end 122a. In addition, the main coil surfaces 130, 140 may face each other and may be substantially planar. The main coil surfaces 130, 140 may include a first main coil surface 130 which is one side surface of the multilayer film 110, and a second main coil surface 140 which is the other side surface of the multilayer film 110.

The first main coil surface 130 may include a first electrical conduction layer end surface 131, a first magnetic conduction layer end surface 132, a first adhesive layer end surface 133, and a second adhesive layer end surface 134.

The second main coil surface 140 may include a second electrical conduction layer end surface 141, a second magnetic conduction layer end surface 142, a third adhesive layer end surface 143, and a fourth adhesive layer end surface 144.

Herein, the first electrical conduction layer end surface 131 and the second electrical conduction layer end surface 141 refer to end surfaces of both sides of the first electrical conduction layer 111 in the width direction, and the first magnetic conduction layer end surface 132 and the second magnetic conduction layer end surface 142 refer to end surfaces of both sides of the second magnetic conduction layer 112 in the width direction. In addition, the first adhesive layer end surface 133 and the third adhesive layer end surface 143 refer to end surfaces of both sides of the third adhesive layer 113 in the width direction, and the second adhesive layer end surface 134 and the fourth adhesive layer end surface 144 refer to end surfaces of both sides of the fourth adhesive layer 114 in the width direction.

In the specification, the first electrical conduction layer end surface 131, the first magnetic conduction layer end surface 132, the first adhesive layer end surface 133, the second adhesive layer end surface 134, the second electrical conduction layer end surface 141, the second magnetic conduction layer end surface 142, the third adhesive layer end surface 143, and the fourth adhesive layer end surface 144 may be referred to as corresponding end surfaces 131, 132, 133, 134, 141, 142, 143, 144. In addition, the main coil surfaces 130, 140 may include the corresponding end surfaces 131, 132, 133, 134, 141, 142, 143, 144.

In addition, the first electrical conduction layer 111, the second magnetic conduction layer 112, the third adhesive layer 113, and the fourth adhesive layer 114 may have widths W and lengths L which are substantially coextensive with one another, such that the first main coil surface 130 and the second main coil surface 140, which are substantially planar, include the corresponding end surfaces 131, 132, 133, 134, 141, 142, 143, 144 of first to fourth layers, respectively. In other words, the first electrical conduction layer 111, the second magnetic conduction layer 112, the third adhesive layer 113, and the fourth adhesive layer 114 may be extended to have the same width W and the same length L.

Referring back to FIG. 1, the flexible circuit board 200 may support the coil 100, and may be physically, electrically connected with the coil 100. In addition, the flexible circuit board 200 may allow a current to flow therethrough, and may transmit the current to the coil 100. For example, the flexible circuit board 200 may be a flexible printed circuit board (FPCB). The flexible circuit board 200 may include a terminal unit 210 and a board unit 220.

The terminal unit 210 may be electrically connected to the coil 100. For example, the terminal unit 200 may be terminated on the first electrical conduction layer 111 of the multilayer film 110. In the specification, the terminal unit 200 being terminated on the first electrical conduction layer 111 may be a concept including not only the terminal unit 200 being extended to the first electrical conduction layer 111, but also, the terminal unit 200 coming into contact with the first electrical conduction layer 111 and being electrically connected with the first electrical conduction layer 111. In addition, the terminal unit 210 may include, for example, copper (Cu).

In addition, the terminal unit 200 may be terminated on the first electrical conduction layer 111 of the loop 120 and electrically connected thereto, by one or more processes of a soldering process, a welding process and a conductive adhesive applying process. In addition, the terminal unit 200 may be terminated on the first electrical conduction layer 111 of the loop 120 and electrically connected thereto, by one or more materials of a soldering material, a welding material, and a conductive adhesive. For example, the welding process may include a laser welding process or a spot welding process, and a first electro-conductive terminal 213 may be terminated on the first electrical conduction layer 111 of the first intermediate loop 123 by the laser welding. The terminal unit 210 may include an inner electro-conductive terminal 211, an outer electro-conductive terminal 212, and the first electro-conductive terminal 213.

The inner electro-conductive terminal 211 may be terminated on the first electrical conduction layer 111 of the innermost loop 121, and may be electrically connected to the first electrical conduction layer 111.

The outer electro-conductive terminal 212 may be terminated on the first electrical conduction layer 111 of the outermost loop 122, and may be electrically connected to the first electrical conduction layer 111.

The first electro-conductive terminal 213 may be terminated on the first electrical conduction layer 111 of the first intermediate loop 123 and may be electrically connected thereto. The first electro-conductive terminal 213 may be provided as one pair of two terminals. For example, one first electro-conductive terminal 213 is terminated at one side of the first intermediate loop 123, and the other first electro-conductive terminal 213 may be terminated at the other side of the first intermediate loop 123.

Figure 5:
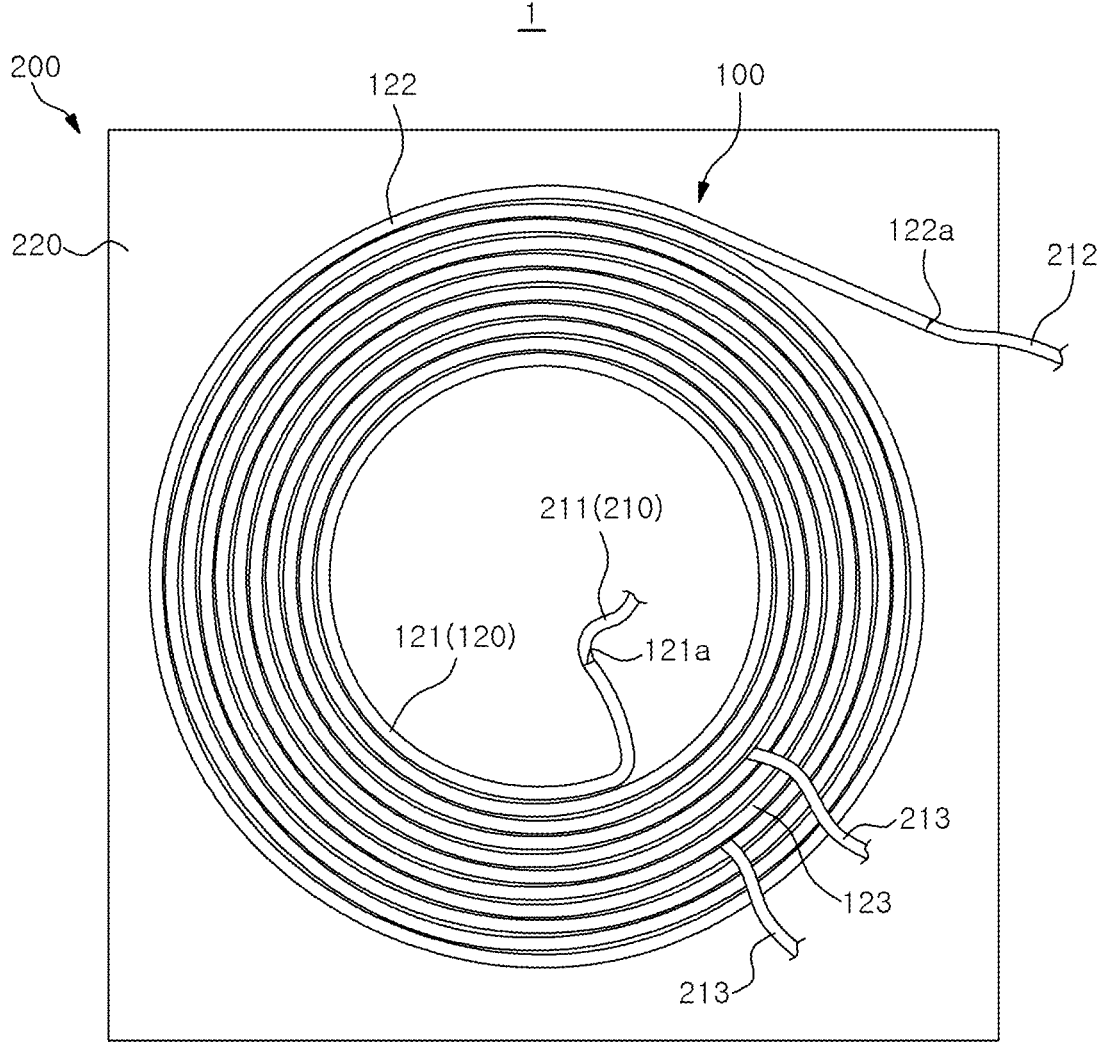
FIG. 5 is a top view illustrating a change in the position of the terminal unit of FIG. 1.

In the specification, the inner electro-magnetic conductive terminal 211 and the outer electro-conductive terminal 212 are terminated at middle points of the innermost loop 121 and the outermost loop 122, respectively, and are electrically connected thereto, but this is merely an example, and the present invention is not limited thereto. Accordingly, as shown in FIG. 5, the inner electro-conductive terminal 211 may be terminated at the side of the first longitudinal end 121*a* of the first electrical conduction layer 111 of the innermost loop 121, and may be electrically connected thereto, and the outer electro-conductive terminal 212 may be terminated at the side of the second longitudinal end 122*a* of the first electrical conduction layer 111 of the outermost loop 122, and may be electrically connected thereto.

The board unit 220 may support the coil 100 and the conductive terminal 220. The board unit 220 may be an electrically insulated layer. For example, the board unit 220 may include a plastic resin such as polyimide.

In addition such a configuration, the loop 120 according to a second embodiment of the present disclosure may further include a second intermediate loop 124. Hereinafter, the second embodiment of the present disclosure will be described with further reference to FIG. 6. In describing the second embodiment, differences from the above-described embodiment are mainly described, and the same description and reference numerals are referred to the above-described embodiment.

Figure 6:
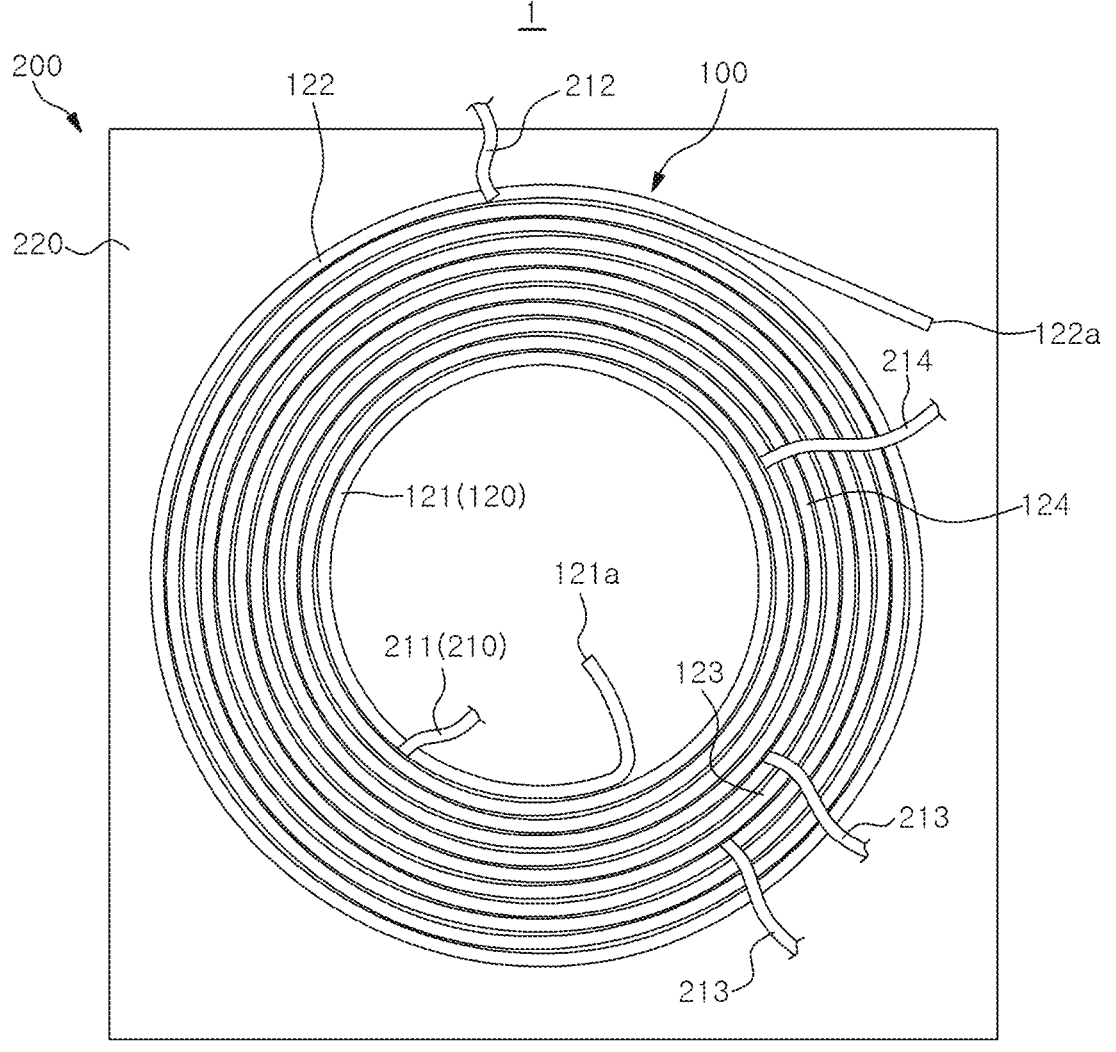
FIG. 6 is a top view of an electrical system according to a second embodiment of the present disclosure.

Referring to FIG. 6, the loop 120 may include an innermost loop 121, an outermost loop 122, a first intermediate loop 123, and a second intermediate loop 124.

The first intermediate loop 123 may be disposed between the outermost loop 122 and the second intermediate loop 124. One end of the first intermediate loop 120 is connected with the outermost loop 122, and the other end is connected with the second intermediate loop 124.

The second intermediate loop 124 may be different from the first intermediate loop 123, and may be disposed between the innermost loop 121 and the first intermediate loop 123. One end of the second intermediate loop 124 is connected with the innermost loop 121, and the other end is connected with the first intermediate loop 123.

The innermost loop 121, the outermost loop 122, the first intermediate loop 123, and the second intermediate loop 124 may provide different functions. In addition, the functions provided by the innermost loop 121, the outermost loop 122, the first intermediate loop 123, and the second intermediate loop 124 may be independent from one another or dependent on one another.

In addition, the terminal unit 200 may further include a second electro-conductive terminal 214 which is terminated on the first electrical conduction layer 111 of the second intermediate loop 124. The second electro-conductive terminal 214 may be terminated at one point of the first electrical conduction layer 111 of the second intermediate loop 124.

As described above, the coil 100 according to the second embodiment of the present disclosure may provide a plurality of functions as one coil 100.

Although not shown in detail in FIG. 6, a plurality of first electrical conduction layers 111 may be provided according to the present embodiment, as in FIG. 3.

Hereinafter, a third embodiment of the present disclosure will be described with reference to FIG. 7. A first location 125 may be formed on the loop 120 according to the third embodiment of the present disclosure.

The first location 125 may be provided by penetrating through the loop 120. Due to the first location 125, the first intermediate loop 123 may be distinguished from the innermost loop 121 or the outermost loop 122, and may be configured to be electrically discontinuous from each other. In addition, the first location 125 may be provided on a position adjacent to the place where the first electro-conductive terminal 213 is terminated on the first electrical conduction layer 111 of the first intermediate loop 123.

The first location 125 may be provided on the first electrical conduction layer 111 of the first intermediate loop 123 by a process including laser cutting or laser ablation.

Figure 7:
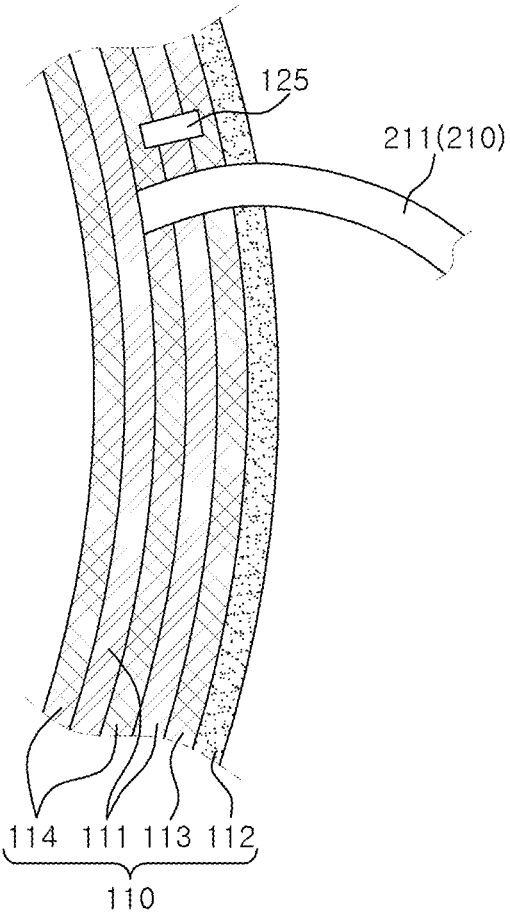
FIG. 7 is a top view of a coil and a terminal unit according to a third embodiment of the present disclosure.
Figure 8:
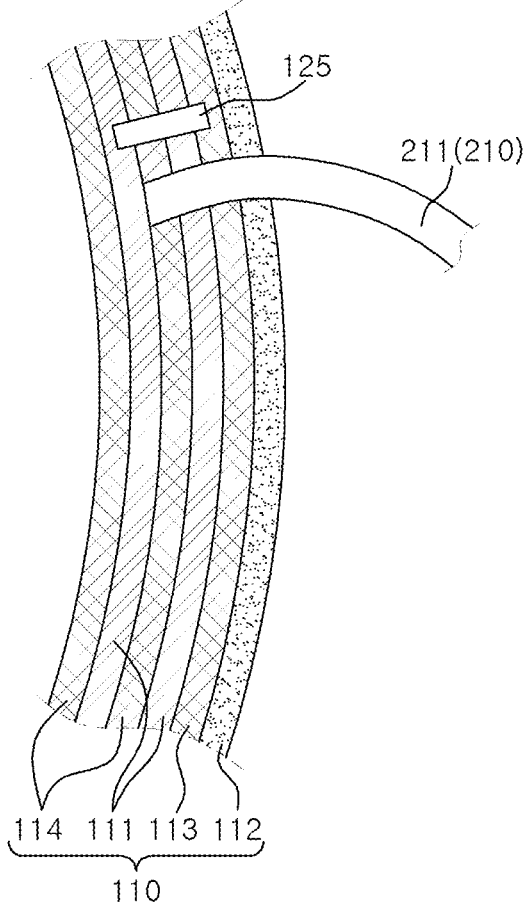
FIG. 8 is a top view illustrating an extended state of a first location of FIG. 7.

Although FIG. 7 illustrates that the first location 125 is provided on one first electrical conduction layer 111, this is merely an example. As shown in FIG. 8, the first location 125 may be provided on the plurality of first electrical conduction layer 111.

As described above, the loop 120 according to the third embodiment of the present disclosure is configured to make the first intermediate loop 123 be electrically discontinuous from the innermost loop 121 or the outermost loop 122 due to the first location 125. Accordingly, the first intermediate loop 123 does not influence the innermost loop 121 or the outermost loop 122 and may provide an independent function.

Figure 9:
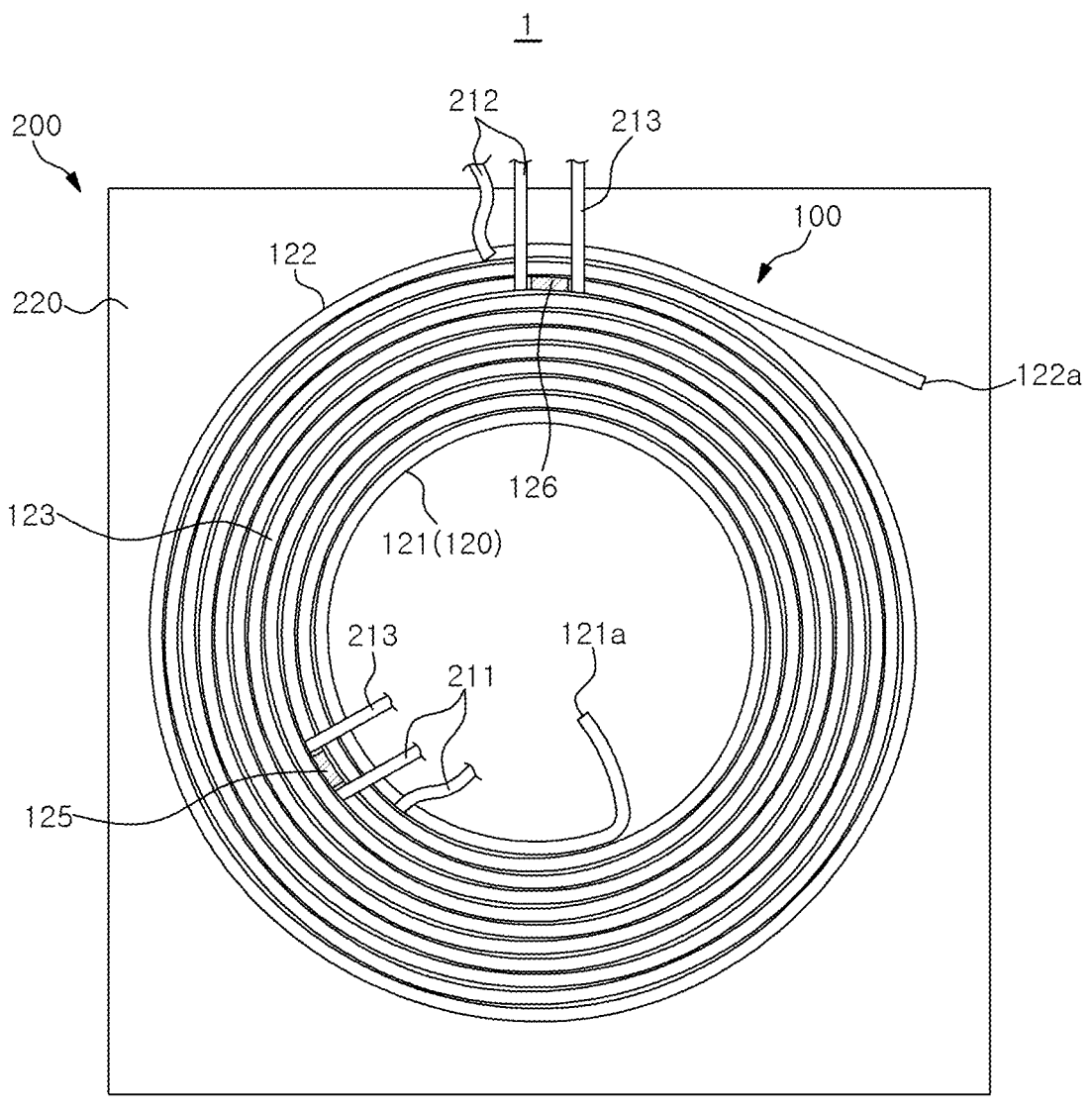
FIG. 9 is a top view of an electrical system according to a fourth embodiment of the present disclosure.
Figure 10:
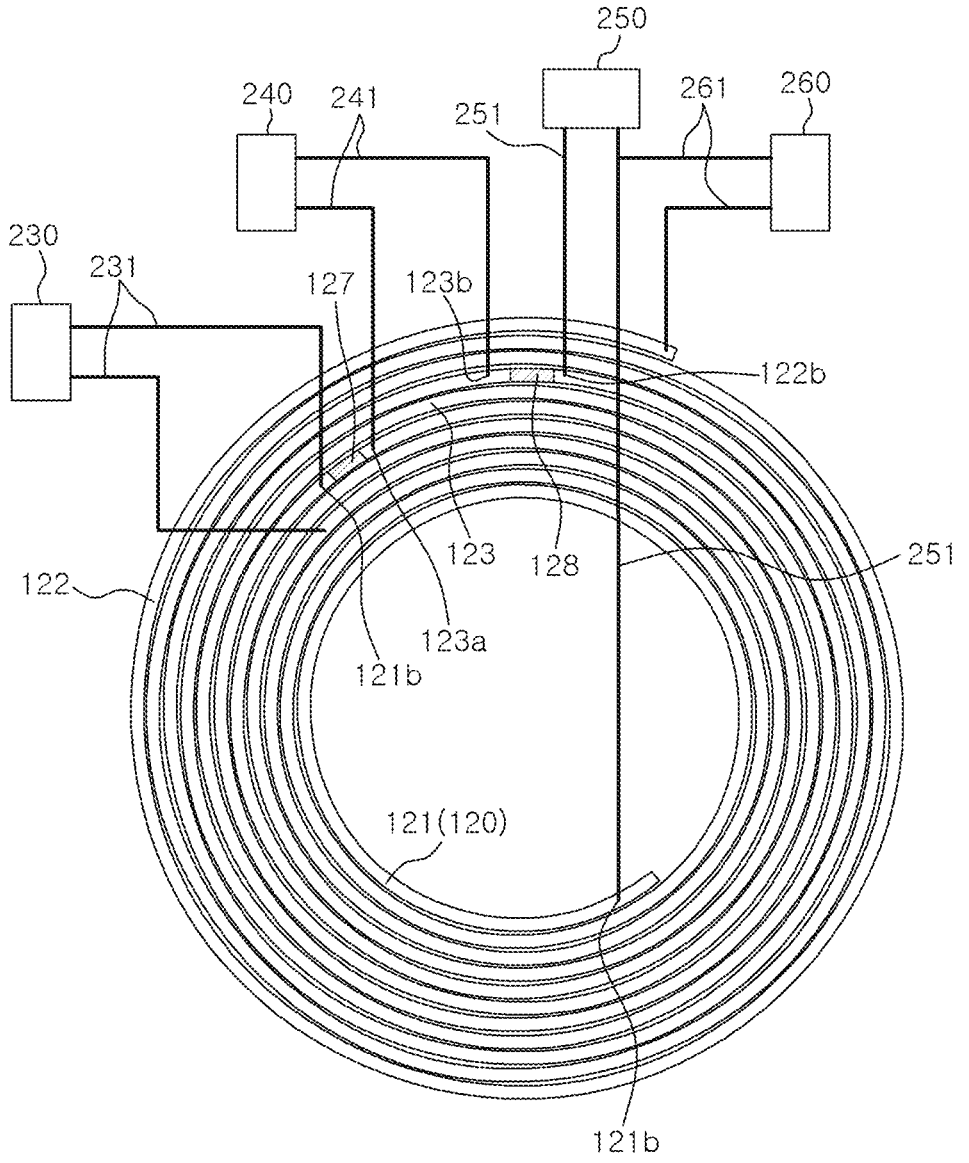
FIG. 10 is a top view of an electrical system according to a fifth embodiment of the present disclosure.

Hereinafter, a fourth embodiment of the present disclosure will be described with reference to FIG. 9. The loop 120 according to the fourth embodiment of the present disclosure may include an innermost loop 121, an outermost loop 122, and a first intermediate loop 123, and a first location 125 and a second location 126 may be formed on the loop 120.

In addition, an inner electro-conductive terminal 211, an outer electro-conductive terminal 212, and a first electro-conductive terminal 213 may be provided to form one pair of two terminals, respectively.

The first location 125 may be provided by penetrating through the loop 120. The innermost loop 121 and the first intermediate loop 123 may be distinguished from each other due to the first location 125, and may be configured to be electrically discontinuous from each other. In addition, the first location 125 may be provided between one inner electro-conductive terminal 211 and one first electro-conductive terminal 213. Accordingly, one inner electro-conductive terminal 211 may be terminated on the first electrical conduction layer 111 at one side adjacent to the first location 125, and one first electro-conductive terminal 213 may be terminated on the first electrical conduction layer 111 at the other side adjacent to the first location 125, and may be electrically connected thereto.

The second location 126 may be provided by penetrating through the loop 120, and may be provided on a position different from the first location 125. The outermost loop 122 and the first intermediate loop 123 may be distinguished from each other due to the second location 126, and may be configured to be electrically discontinuous from each other. In addition, the second location 126 may be provided between one outer electro-conductive terminal 212 and the other first electro-conductive terminal 213. Accordingly, one outer electro-conductive terminal 212 may be terminated on the first electrical conduction layer 111 at one side adjacent to the second location 126, and the other first electro-conductive terminal 213 may be terminated on the first electrical conduction layer 111 at the other side adjacent to the second location 126.

As described above, the innermost loop 121, the outermost loop 122, and the first intermediate loop 121 may be discontinuous from one another due to the first location 125 and the second location 126, and may be configured to be independent from one another. Accordingly, the innermost loop 121, the outermost loop 122, and the first intermediate loop 123 may not influence one another, and may perform independent functions.

Hereinafter, a fifth embodiment of the present disclosure will be described with reference to FIG. The loop 120 according to the fifth embodiment of the present disclosure may include an innermost loop 121, an outermost loop 122, and a first intermediate loop 123, and a third location 127 and a fourth location 128 may be provided on the loop 120.

The third location 127 may be provided by penetrating through the loop 120. The innermost loop 121 and the first intermediate loop 123 may be distinguished from each other due to the third location 127, and may be configured to be electrically discontinuous from each other. In addition, the third location 127 may be provided between a first terminal location 121b of the innermost loop 121 and a second termination location 123a of the first intermediate loop 123.

The fourth location 128 may be provided by penetrating through the loop 120, and may be provided on a position different from the third location 127. The outermost loop 122 and the first intermediate loop 123 may be distinguished from each other due to the fourth location 128, and may be configured to be electrically discontinuous from each other. In addition, the fourth location 128 may be provided between a third termination location 122b of the outermost loop 122 and a fourth termination location 123b of the first intermediate loop 123.

The flexible circuit board 200 may include a plurality of electric circuits 230, 240, 250, 260. For example, the plurality of electric circuits 230, 240, 250, 260 may be used for electrically connecting with other electric elements (not shown) and electronic circuit boards (not shown). The plurality of electric circuits 230, 240, 250, 260 may include a first electric circuit 230, a second electric circuit 240, a third electric circuit 250, and a fourth electric circuit 260. In addition, the plurality of electric circuits 230, 240, 250, 260 may include a plurality of terminal leads 231, 241, 251, 261 to connect the plurality of electric circuits 230, 240, 250, 260 and the coil 100.

The first electric circuit 230 may include a first terminal lead 231, and the second electric circuit 240 may include a second terminal lead 241. In addition, the third electric circuit 250 may include a third terminal lead 251, and the fourth electric circuit 260 may include a fourth terminal lead 261.

The first terminal lead 231, the second terminal lead 241, the third terminal lead 251, and the fourth terminal lead 261 may be provided to form one pair of two leads, respectively.

One end of any one of the first terminal leads 231 is extended from the first electric circuit 230, and the other end is terminated on the first electrical conduction layer 111 of the innermost loop 121, and is electrically connected thereto. In addition, one end of the other one of the first terminal leads 231 is extended from the first electric circuit 230, and the other end is terminated on the first electrical conduction layer 111 at a position adjacent to the third location 127 on the innermost loop 121, and is electrically connected thereto.

One end of any one of the second terminal leads 241 is extended from the second electric circuit 240, and the other end is terminated on the first electrical conduction layer 111 at a position adjacent to the third location 127 on the first intermediate loop 123, and is electrically connected thereto. In addition, one end of the other one of the second terminal leads 241 is extended from the first electric circuit 240, and the other end is terminated on the first electrical conduction layer 111 at a position adjacent to the fourth location 128, and is electrically connected thereto.

One end of any one of the third terminal leads 251 is extended from the third electric circuit 250, and the other end is terminated on the first electrical conduction layer 111 at a position adjacent to the fourth location 128 on the outermost loop 122, and is electrically connected thereto. In addition, one end of the other one of the third terminal leads 251 is extended from the third electric circuit 250, and the other end is terminated on the first electrical conduction layer 111 of the innermost loop 121 and is electrically connected thereto.

One end of any one of the fourth terminal leads 261 is extended from the fourth electric circuit 260, and the other end is terminated on the outermost loop 122 and is electrically connected thereto. In addition, one end of the other one of the fourth terminal leads 261 is extended from the fourth electric circuit 260, and the other end is terminated on the third terminal lead 251 connected with the innermost loop 121, and is electrically connected thereto. As described above, any one of the pair of the third terminal leads 251 of the third electric circuit 250, and any one of the pair of the fourth terminal leads 261 of the fourth electric circuit 260 may be connected with each other, and may be terminated at the same location of the same loop 120 from among the plurality of concentric loops 120.

Figure 11:
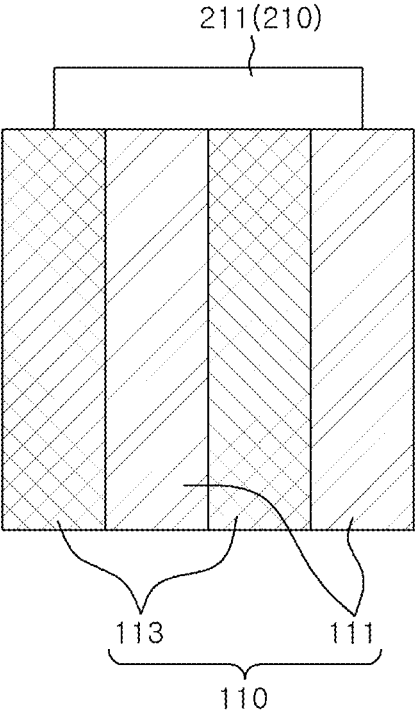
FIG. 11 is a partial cross-sectional view of a coil according to a sixth embodiment of the present disclosure.

Hereinafter, a sixth embodiment of the present disclosure will be described with reference to FIG. 11. The multilayer film 110 according to the sixth embodiment of the present disclosure may include a first electrical conduction layer 111 and a third adhesive layer 113.

A plurality of first electrical conduction layers 111 and a plurality of third adhesive layers 113 may be provided. The plurality of first electrical conduction layers 111 and the plurality of third adhesive layers 113 may be disposed alternately with one another. In addition, the first electrical conduction layer 111 and the third adhesive layer 113 may have widths W and lengths L which are substantially coextensive with each other, such that the first main coil surface 130 and the second main coil surface 140, which are substantially planar, include corresponding end surfaces 131, 133, 141, 143 of the first and third layers, respectively.

The following is a list of embodiments of present disclosure.

Item 1 relates to a coil including: main coil surfaces which face each other and are substantially planar; and a multilayer film which is wound to form a plurality of loops which are substantially concentric, wherein the plurality of loops include an innermost loop including a first longitudinal end of the coil, a first intermediate loop, and an outermost loop including a second longitudinal end of the coil, wherein the multilayer film includes a first electrical conduction layer, a second magnetic conduction layer, and a third adhesive layer, wherein the second magnetic conduction layer is coupled with the first electrical conduction layer by the third adhesive layer, wherein the first electrical conduction layer, the second magnetic conduction layer, and the third adhesive layer have widths and lengths which are substantially coextensive with one another, such that the main coil surfaces which are substantially planar include corresponding end surfaces of the first to third layers, respectively, wherein the first intermediate loop is disposed between the innermost loop and the outermost loop, wherein a first electro-conductive terminal is terminated on the first electrical conduction layer of the first intermediate loop.

Item 2 relates to the coil, wherein an outer electro-conductive terminal is terminated on the first electrical conduction layer of the outermost loop, and an inner electroconductive terminal is terminated on the first electrical conduction layer of the innermost loop.

Item 3 relates to the coil, wherein the outer electro-conductive terminal is terminated on the first electrical conduction layer of the outermost loop at the second longitudinal end, and the inner electro-conductive terminal is terminated on the first electrical conduction layer of the innermost loop at the first longitudinal end.

Item 4 relates to the coil, wherein the plurality of loops which are substantially concentric further includes a second intermediate loop, wherein the second intermediate loop is different from the first intermediate loop, and is disposed between the innermost loop and the outermost loop, and wherein a second electro-conductive terminal which is different from the first electro-conductive terminal is terminated on the first electrical conduction layer of the second intermediate loop.

Item 5 relates to the coil, wherein the first electrical conduction layer of the first intermediate loop is formed to be electrically discontinuous at a first location adjacent to a place where the first electro-conductive terminal is terminated on the first electrical conduction layer of the first intermediate loop.

Item 6 relates to the coil, wherein the first electrical conduction layer of the first intermediate loop is formed to be discontinuous at the first location by a process including laser cutting or laser ablation.

Item 7 relates to the coil, wherein the multilayer film includes a plurality of first electrical conduction layers which alternate with one another, and a fourth adhesive layer, wherein the second magnetic conduction layer is coupled with any one of the plurality of first electrical conduction layers by the third adhesive layer, wherein the first electrical conduction layer, the second magnetic conduction layer, the third adhesive layer, and the fourth adhesive layer have widths and lengths which are substantially coextensive with one another, such that the main coil surfaces which are substantially planar include corresponding end surfaces of the first to fourth layers, respectively, and wherein the first electro-conductive terminal is terminated on the respective first electrical conduction layers of the first intermediate loop.

Item 8 relates to the coil, wherein the respective first electrical conduction layers are formed to be electrically discontinuous at a first location adjacent to a place where the first electro-conductive terminal is terminated on the respective first electrical conduction layers of the first intermediate loop.

Item 9 relates to the coil, wherein the first electro-conductive terminal is terminated on the first electrical conduction layer of the first intermediate loop by one or more of a soldering material, a welding material, and a conductive adhesive.

Item 10 relates to the coil, wherein the first electro-conductive terminal is terminated on the first electrical conduction layer of the first intermediate loop by one or more of a soldering process, a welding process, and a conductive adhesive applying process.

Item 11 relates to the coil, wherein the welding process includes a laser welding process or a spot welding process.

Item 12 relates to a coil including a multilayer film which is wound to form a plurality of loops which include an innermost loop and an outermost loop and are substantially concentric, wherein the multilayer film includes a plurality of first electrical conduction layers and a second magnetic conduction layer, wherein the plurality of first electrical conduction layers and the second magnetic conduction layer have widths and lengths which are substantially coextensive with each other, such that corresponding end surfaces of the plurality of first electrical conduction layers and the second magnetic conduction layer face each other and define substantially planar main coil surfaces, and wherein, with respect to at least one intermediate loop disposed between the innermost loop and the outermost loop, an electroconductive terminal is terminated on the plurality of first electrical conduction layers of the intermediate loop.

Item 13 relates to the coil, wherein the multilayer film further includes a plurality of adhesive layers which are alternately disposed between adjacent the plurality of first electrical conduction layers ad the second magnetic conduction layer, wherein the plurality of adhesive layers have widths and lengths which are substantially coextensive with the plurality of first electrical conduction layers and the second magnetic conduction layer.

Item 14 relates to an electrical system including: a coil including a plurality of concentric loops including an innermost loop and an outermost loop, each loop including a first electrical conduction layer and a second magnetic conduction layer, the first electrical conduction layer and the second magnetic conduction layer having widths and lengths which are substantially coextensive; and a plurality of electric circuits, wherein each of the plurality of electric circuits includes a pair of terminal leads attached to the electric circuit and extended from the electric circuit, wherein each pair of the terminal leads of the plurality of electric circuits is terminated on the first electrical conduction layer of different concentric loops from among the plurality of concentric loops of the coil, wherein at least two terminal leads of the plurality of terminal leads of the plurality of electric circuits are terminated on the first electrical conduction layer of the same loop of the plurality of concentric loops which are positioned at a first termination location and a second termination location, respectively, wherein the first electrical conduction layer is formed to be discontinuous at a third location between the first termination location and the second termination location.

Item 15 relates to the electrical system, wherein the terminal lead of each pair of the terminal leads in the at least two electric circuits is terminated at the same location of the same loop of the plurality of concentric loops.

Item 16 relates to a coil including: main coil surfaces which face each other and are substantially planar; and a multilayer film which is wound to form a plurality of loops which are substantially concentric, wherein the plurality of loops include an innermost loop including a first longitudinal end of the coil, a first intermediate loop, and an outer-most loop including a second longitudinal end of the coil, wherein the multilayer film includes a first electrical conduction layer and a third adhesive layer, wherein the first electrical conduction layer and the third adhesive layer have widths and lengths which are substantially coextensive with each other, such that the main coil surfaces which are substantially planar include corresponding end surfaces of the first and third layers, respectively, wherein the first intermediate loop is disposed between the innermost loop and the outermost loop, wherein a first electro-conductive terminal is terminated on the first electrical conduction layer of the first intermediate loop.

Item 17 relates to the coil, wherein an outer electro-conductive terminal is terminated on the first electrical conduction layer of the outermost loop, and an inner electro-conductive terminal is terminated on the first electrical conduction layer of the innermost loop.

Item 18 relates to the coil, wherein the plurality of loops which are substantially concentric further include a second intermediate loop, wherein the second intermediate loop is different from the first intermediate loop, and is disposed between the innermost loop and the outermost loop, and wherein a second electro-conductive terminal which is different from the first electro-conductive terminal is terminated on the first electrical conduction layer of the second intermediate loop.

Item 19 relates to the coil, wherein the first electrical conduction layer of the first intermediate loop is formed to be electrically discontinuous at a first location adjacent to a place where the first electro-conductive terminal is terminated on the first electrical conduction layer of the first intermediate loop.

Although embodiments of the present disclosure have been described by referring to specific embodiments, these are merely certain examples, and the present disclosure is not limited thereto, and should be interpreted as having the broadest scope according to the technical concept disclosed herein. Those skilled in the art will be able to combine and/or substitute the disclosed embodiments to effect a pattern of a shape that has not been stated herein, but this also does not depart from the scope of the present disclosure. Further, it will be apparent to those skilled in the art that various changes and modifications may be readily made to the disclosed embodiments based on the specification without departing from the idea and scope of the invention as defined by the appended claims

| Description of Reference Numerals | |
| --- | --- |
| 1: electrical system | 100: coil |
| 110: multilayer film | 111: first electrical conduction layer |
| 112: second magnetic conduction layer | 113: third adhesive layer |
| 114: fourth adhesive layer | 120: loop |
| 121: innermost loop | 121a: first longitudinal end |
| 122: outermost loop | 122a: second longitudinal end |
| 123: first intermediate loop | 124: second intermediate loop |
| 125: first location | 126: second location |
| 127: third location | 128: fourth location |
| 130: first main coil surface | 140: second main coil surface |
| 200: flexible circuit board | 210: terminal unit |
| 211: inner electro-conductive terminal | 212: outer electro-conductive terminal |
| 213: first electro-conductive terminal | 214: second electro-conductive terminal |
| 220: board unit | 230: first electric circuit |
| 231: first terminal lead | 240: second electric circuit |
| 241: second terminal lead | 250: third electric circuit |
| 251: third terminal lead | 260: fourth electric circuit |
| 261: fourth terminal lead | |

What is claimed is:

1. A coil comprising:
main coil surfaces which face each other and are substantially planar; and
a multilayer film which is wound to form a plurality of loops which are substantially concentric,
wherein the plurality of loops comprise an innermost loop comprising a first longitudinal end of the coil, a first intermediate loop, and an outermost loop comprising a second longitudinal end of the coil,
wherein the multilayer film comprises a first electrical conduction layer, a second magnetic conduction layer, and a third adhesive layer,
wherein the second magnetic conduction layer is coupled with the first electrical conduction layer by the third adhesive layer,
wherein the first electrical conduction layer, the second magnetic conduction layer, and the third adhesive layer have widths and lengths which are substantially coextensive with one another, such that the main coil surfaces which are substantially planar comprise corresponding end surfaces of the first to third layers, respectively,
wherein the first intermediate loop is disposed between the innermost loop and the outermost loop,
wherein a first electro-conductive terminal is terminated on the first electrical conduction layer of the first intermediate loop.

2. The coil of claim 1,
wherein the plurality of loops which are substantially concentric further comprises a second intermediate loop,
wherein the second intermediate loop is different from the first intermediate loop, and is disposed between the innermost loop and the outermost loop, and
wherein a second electro-conductive terminal which is different from the first electro-conductive terminal is terminated on the first electrical conduction layer of the second intermediate loop.

3. The coil of claim 1,
wherein the first electrical conduction layer of the first intermediate loop is formed to be electrically discontinuous at a first location adjacent to a place where the first electro-conductive terminal is terminated on the first electrical conduction layer of the first intermediate loop.

4. The coil of claim 1,
wherein the multilayer film comprises a plurality of first electrical conduction layers which alternate with one another, and a fourth adhesive layer,
wherein the second magnetic conduction layer is coupled with any one of the plurality of first electrical conduction layers by the third adhesive layer,
wherein the first electrical conduction layer, the second magnetic conduction layer, the third adhesive layer, and the fourth adhesive layer have widths and lengths which are substantially coextensive with one another, such that the main coil surfaces which are substantially planar comprise corresponding end surfaces of the first to fourth layers, respectively, and wherein the first electro-conductive terminal is terminated on the respective first electrical conduction layers of the first intermediate loop.

5. A coil comprising a multilayer film which is wound to form a plurality of loops which comprise an innermost loop and an outermost loop and are substantially concentric,
wherein the multilayer film comprises
a plurality of first electrical conduction layers and a second magnetic conduction layer,
wherein the plurality of first electrical conduction layers and the second magnetic conduction layer have widths and lengths which are substantially coextensive with each other, such that corresponding end surfaces of the plurality of first electrical conduction layers and the second magnetic conduction layer face each other and define substantially planar main coil surfaces, and
wherein, with respect to at least one intermediate loop disposed between the innermost loop and the outermost loop, an electro-conductive terminal is terminated on the plurality of first electrical conduction layers of the intermediate loop.

6. The coil of claim 5,
wherein the multilayer film further comprises a plurality of adhesive layers,
wherein each of the adhesive layers is disposed between any one of the plurality of first electrical conduction layers and the second magnetic conduction layer, or is disposed between adjacent first electrical conduction layers from among the plurality of first electrical conduction layers, and
wherein the plurality of adhesive layers have widths and lengths which are substantially coextensive with the plurality of first electrical conduction layers and the second magnetic conduction layer.

7. An electrical system comprising:
a coil comprising a plurality of concentric loops comprising an innermost loop and an outermost loop, each loop comprising a first electrical conduction layer and a second magnetic conduction layer, the first electrical conduction layer and the second magnetic conduction layer having widths and lengths which are substantially coextensive; and
a plurality of electric circuits,
wherein each of the plurality of electric circuits comprises a pair of terminal leads attached to the electric circuit and extended from the electric circuit,
wherein each pair of the terminal leads of the plurality of electric circuits is terminated on the first electrical conduction layer of different concentric loops from among the plurality of concentric loops of the coil,
wherein at least two terminal leads of the plurality of terminal leads of the plurality of electric circuits are terminated on the first electrical conduction layer of the same loop of the plurality of concentric loops which are positioned at a first termination location and a second termination location, respectively,
wherein the first electrical conduction layer is formed to be discontinuous at a third location between the first termination location and the second termination location.

* * * * *